(12) United States Patent
Spoto et al.

(10) Patent No.: US 11,991,298 B2
(45) Date of Patent: May 21, 2024

(54) METHOD FOR THE EXECUTION OF AN INSTANCE OF A SMART CONTRACT BY MEANS OF A BLOCKCHAIN

(71) Applicant: AILIA SA, Zug (CH)

(72) Inventors: Fausto Spoto, Zug (CH); Iris Dimni, Zug (CH); Francesco Pasetto, Zug (CH); Giovanni Antino, Zug (CH)

(73) Assignee: AILIA SA, Zug (CH)

( * ) Notice: Subject to any disclaimer, the term of this patent is extended or adjusted under 35 U.S.C. 154(b) by 0 days.

(21) Appl. No.: 17/618,522

(22) PCT Filed: Jun. 15, 2020

(86) PCT No.: PCT/IB2020/055582
§ 371 (c)(1),
(2) Date: Dec. 13, 2021

(87) PCT Pub. No.: WO2020/250206
PCT Pub. Date: Dec. 17, 2020

(65) Prior Publication Data

US 2022/0247583 A1    Aug. 4, 2022

(30) Foreign Application Priority Data

Jun. 14, 2019  (IT) .......................... 102019000008991
Nov. 6, 2019   (IT) .......................... 102019000020476

(51) Int. Cl.
G06F 21/62   (2013.01)
H04L 9/00    (2022.01)

(52) U.S. Cl.
CPC ............ H04L 9/50 (2022.05); G06F 21/6218 (2013.01)

(58) Field of Classification Search
CPC .............................. H04L 9/50; G06F 21/6128
(Continued)

(56) References Cited

U.S. PATENT DOCUMENTS 6,185,663 B1 * 2/2001 Burke ................. G06F 11/1471
                                           714/E11.13
10,380,685 B1 * 8/2019 Phillips ................. H04L 9/0637
(Continued)

FOREIGN PATENT DOCUMENTS

CN    107463668 A  * 12/2017    ....... G06F 16/24568
CN    107463668 A    12/2017
(Continued)

OTHER PUBLICATIONS

Dinh, Hoang T., Chonho Lee, Dusit Niyato, and Ping Wang. "A survey of mobile cloud computing: architecture, applications, and approaches." Wireless communications and mobile computing 13, No. 18 (2013): 1587-1611. (Year: 2013).*
(Continued)

*Primary Examiner* — Luu T Pham
*Assistant Examiner* — Walter J Malinowski
(74) *Attorney, Agent, or Firm* — Bayramoglu Law Offices LLC

(57) ABSTRACT

A method of executing an instance of a smart contract through a blockchain shared among a plurality of nodes including the following first step of serializing in the blockchain of the instance of the smart contract, and the following steps in cyclical succession: a second step of serializing a plurality of status files each containing a state defined only by internal variables of the instance at an end of a respective plurality of executions of the instance, the plurality of status files are temporally ordered according to the respective plurality of executions of the instance, a third step of deserializing in a RAM of a last state of the instance by deserializing at least one last state file from the blockchain, and a fourth step of deserializing the instance by valuing a second state of the instance as a last state, a fifth step including further execution of the instance.

11 Claims, 4 Drawing Sheets

(58) Field of Classification Search
USPC .......................................................... 173/189
See application file for complete search history.

(56) References Cited

U.S. PATENT DOCUMENTS

| | | | | |
|---|---|---|---|---|
| 2001/0025264 | A1* | 9/2001 | Deaddio | G06Q 40/025 |
| | | | | 705/36 R |
| 2003/0191803 | A1* | 10/2003 | Chinnici | H04L 67/34 |
| | | | | 709/203 |
| 2005/0108627 | A1 | 5/2005 | Mireku | |
| 2005/0177579 | A1* | 8/2005 | Blakeley | G06F 16/244 |
| 2006/0029230 | A1* | 2/2006 | Kihara | G11C 7/16 |
| 2010/0023942 | A1* | 1/2010 | Sheu | G06F 9/485 |
| | | | | 718/1 |
| 2011/0276864 | A1* | 11/2011 | Oules | G06F 16/40 |
| | | | | 715/202 |
| 2016/0292152 | A1* | 10/2016 | Dennis | G06F 16/23 |
| 2016/0292591 | A1* | 10/2016 | Guirguis | G06N 20/20 |
| 2016/0335533 | A1* | 11/2016 | Davis | G06Q 40/08 |
| 2016/0337400 | A1* | 11/2016 | Gupta | G06F 16/2455 |
| 2017/0031937 | A1* | 2/2017 | Bowman | G06F 9/5077 |
| 2017/0228266 | A1* | 8/2017 | Johansson | G06F 21/606 |
| 2017/0230189 | A1* | 8/2017 | Toll | H04L 9/0618 |
| 2017/0322783 | A1* | 11/2017 | Khoyi | G06F 3/0482 |
| 2018/0183812 | A1* | 6/2018 | Maresca | H04L 63/126 |
| 2018/0218176 | A1* | 8/2018 | Voorhees | G06Q 20/02 |
| 2019/0104196 | A1* | 4/2019 | Li | G06F 16/27 |
| 2019/0114626 | A1* | 4/2019 | Pogorelik | G06Q 20/00 |
| 2019/0129893 | A1* | 5/2019 | Baird, III | G06F 16/2474 |
| 2019/0236598 | A1* | 8/2019 | Padmanabhan | G06Q 20/389 |
| 2019/0279321 | A1* | 9/2019 | Sheets | H04L 9/0643 |
| 2019/0306235 | A1* | 10/2019 | Veale | H04L 9/3239 |
| 2019/0355057 | A1* | 11/2019 | Phillips | H04L 9/0637 |
| 2019/0372772 | A1* | 12/2019 | Novotny | H04L 9/3239 |
| 2020/0034448 | A1* | 1/2020 | Sato | H04L 9/50 |
| 2020/0034453 | A1* | 1/2020 | Sato | G06F 16/18 |
| 2020/0034469 | A1* | 1/2020 | Sato | G06F 16/1834 |
| 2020/0058091 | A1* | 2/2020 | Dcosta | G06Q 50/265 |
| 2020/0104838 | A1* | 4/2020 | Sidani | G06Q 20/405 |
| 2020/0112440 | A1* | 4/2020 | Nakamura | H04L 9/3247 |
| 2020/0159570 | A1* | 5/2020 | Askeland | H04W 4/40 |
| 2020/0320220 | A1* | 10/2020 | Beno | H04L 9/3247 |
| 2020/0342454 | A1* | 10/2020 | Manka | H04L 63/062 |
| 2020/0371965 | A1* | 11/2020 | Medvedeva | H04L 9/3239 |
| 2020/0394651 | A1* | 12/2020 | Kreder, III | G06Q 20/02 |
| 2021/0082033 | A1* | 3/2021 | Yao | G06Q 20/405 |
| 2021/0144195 | A1* | 5/2021 | Takahashi | H04L 67/06 |
| 2023/0196347 | A1* | 6/2023 | Tate | G06Q 20/3827 |
| | | | | 705/75 |

FOREIGN PATENT DOCUMENTS

| | | | | |
|---|---|---|---|---|
| CN | 109040029 | A * | 12/2018 | H04L 63/08 |
| CN | 109040029 | A | 12/2018 | |
| CN | 109598144 | A * | 4/2019 | G06F 21/602 |
| CN | 111221780 | A * | 6/2020 | G06F 16/137 |
| CN | 113626324 | A * | 11/2021 | |
| CN | 114490440 | A * | 5/2022 | G06F 12/023 |
| CN | 116932647 | A * | 10/2023 | |
| WO | 0055727 | A2 | 9/2000 | |
| WO | 2019034959 | A1 | 2/2019 | |
| WO | 2019072280 | A2 | 4/2019 | |
| WO | WO-2019072280 | A3 * | 9/2019 | G06F 21/602 |
| WO | WO-2019072283 | A3 * | 9/2019 | G06F 21/00 |
| WO | WO-2020250206 | A1 * | 12/2020 | G06F 21/602 |

OTHER PUBLICATIONS

Xu, Xiwei, Cesare Pautasso, Liming Zhu, Vincent Gramoli, Alexander Ponomarev, An Binh Tran, and Shiping Chen. "The blockchain as a software connector." In 2016 13th Working IEEE/IFIP Conference on Software Architecture (WICSA), pp. 182-191. IEEE, 2016. (Year: 2016).*

Zhang, Fan, Ethan Cecchetti, Kyle Croman, Ari Juels, and Elaine Shi. "Town crier: An authenticated data feed for smart contracts." In Proceedings of the 2016 aCM sIGSAC conference on computer and communications security, pp. 270-282. 2016. (Year: 2016).*

Kongmanee, Jaturong, Phongphun Kijsanayothin, and Rattikorn Hewett. "Securing smart contracts in blockchain." In 2019 34th IEEE/ACM International Conference on Automated Software Engineering Workshop (ASEW), pp. 69-76. IEEE, 2019. (Year: 2019).*

Kolluri, Aashish, Ivica Nikolic, Ilya Sergey, Aquinas Hobor, and Prateek Saxena. "Exploiting the laws of order in smart contracts." In Proceedings of the 28th ACM SIGSOFT international symposium on software testing and analysis, pp. 363-373. 2019. (Year: 2019).*

Dai, Weiqi, Chenlong Wang, Changze Cui, Hai Jin, and Xinqiao Lv. "Blockchain-Based Smart Contract Access Control System." In 2019 25th Asia-Pacific Conference on Communications (APCC), pp. 19-23. IEEE, 2019. (Year: 2019).*

Liu, Bowen, Siwei Sun, and Pawel Szalachowski. "SMACS: smart contract access control service." In 2020 50th Annual IEEE/IFIP International Conference on Dependable Systems and Networks (DSN), pp. 221-232. IEEE, 2020. (Year: 2020).*

Al-Bassam, Mustafa, Alberto Sonnino, Shehar Bano, Dave Hrycyszyn, and George Danezis. "Chainspace: A sharded smart contracts platform." arXiv preprint arXiv:1708.03778 (2017). (Year: 2017).*

Anjana, Parwat Singh, Sweta Kumari, Sathya Peri, Sachin Rathor, and Archit Somani. "An efficient framework for optimistic concurrent execution of smart contracts." In 2019 27th Euromicro International Conference on Parallel, Distributed and Network-Based Processing (PDP), pp. 83-92. IEEE, 2019. (Year: 2019).*

Imran Bashir, Mastering Blockchain, Packt, 2017, pp. 1-504.

* cited by examiner

METHOD FOR THE EXECUTION OF AN INSTANCE OF A SMART CONTRACT BY MEANS OF A BLOCKCHAIN

CROSS REFERENCE TO THE RELATED APPLICATIONS

This application is the national stage entry of International Application No. PCT/IB2020/055582, filed on Jun. 15, 2020, which is based upon and claims priority to Italian Patent Application No. 102019000008991 filed on Jun. 14, 2019, and claims priority to Italian Patent Application No. 102019000020476 filed on Nov. 6, 2019, the entire contents of which are incorporated herein by reference.

TECHNICAL FIELD

The present invention relates to a method for the execution of an instance of a smart contract by means of a blockchain.

BACKGROUND

Blockchain technology can be applied to a wide range of transactions. These can be monetary transfers, as in Bitcoin, or much more complex transactions, in particular state transitions, managed within a sort of distributed computing, as in the case of Ethereum.

Blockchains are in fact made up of nodes in which each node can be a single server or a cluster.

Each node on the network maintain a copy of the blockchain.

A Smart Contract is the transposition in the form of a code of a contract in which some conditions are variable. In particular, the execution of a smart contract in one of the nodes of a blockchain allows to automatically checking the fulfilment of certain conditions and to automatically perform actions or give instructions so that certain actions can be performed when these conditions are checked. In other words, the Smart Contract is based on a code that "reads" both the clauses that have been agreed and the actual conditions and if these correspond with those agreed, pre-determined instructions are carried out.

Solidity is the current reference programming language for Ethereum, focused on smart contracts.

The latter are objects in the blockchain and incorporate protocols that specify the operating stages of a blockchain transaction and can be applied to much more than a monetary transfer. Their execution may require the payment of a sum of money proportional to the number of execution steps.

In particular, according to Solidity, the status of the contracts is archived, i.e. made persistent in the blockchain.

One way to archive the status of a smart contract is to archive the entire block of memory that houses the execution of the same smart contract. In other words, the node that executes the smart contract, extracts the last image of the execution memory of the same smart contract from the blockchain, executes it in relation to the relative methods called and subsequently stores the execution memory area in the blockchain. Therefore, the status of the smart contract is archived together with all the temporary execution variables, ready to be extracted again executed and archived again.

It is clear that archiving the execution memory block requires a relevant blockchain storage space, which also involves significant archiving times.

Some blockchains are based on the "proof of work" concept. Namely, they see the nodes competing with each other and the ones with the greatest calculation capacity are the winners.

However, this entails a very significant energy consumption.

In such blockchains, trivial transactions are preferred to smart contracts as smart contracts slow down the completion of blocks and the growth of the blockchain.

There are also blockchains based on the concept of "proof of stake", that is to say on the approval of the work done by a node on the basis of a consensus obtained by the other nodes. Obviously, in this type of blockchain, the reliability of the nodes plays a fundamental role with respect to the capacity/speed of calculation. For this reason, these blockchains are much less expensive in terms of energy than the others.

The hypothesis of having to save and process large amounts of data to execute a smart contract through a blockchain, especially when based on proof of stake, appears contradictory, precisely because the computers used in blockchains based on proof of stake are relatively under-performing, but even inexpensive from an energy point of view.

SUMMARY

The main purpose of the present invention is to provide a method for executing a smart contract to make the execution of the same smart contract faster, more energy-efficient and more reliable.

The basic idea of the present invention is to reduce the amount of data that must be stored within a blockchain.

The execution method of a smart contract according to the present invention is based on the fact of archiving not the entire memory area of the node that executes an instance of a smart contract, but only the set of values of the variables of the machine code executed in the memory of the node. The set of these variables defines the state of an instance.

More preferably, only the values of the variables that have undergone an alteration following the last execution, in temporal terms, of the same instance of a smart contract are extracted and saved.

The execution of a contract can return a value or a variation to the state of the blockehain, for example by transferring tokens from one wallet to another.

With "blockchain status" the information maintained by each node interrelated with the blockchain but not necessarily saved in blockchain transactions is meant, for example a company balance sheet, a current account, etc.

According to the present invention, the aforementioned values of the variables of an instance of a smart contract are extracted from the execution memory area of a node and saved in a status file, having any format and coding. So, while a status file represents the status of an instance of a smart contract, in the blockchain status are stored the persistent locations, i.e. transactions, in which the status files of the same instance are stored, beyond further information necessary for the organization of the block chain.

When, following a new invocation, it is required to continue the execution of a predetermined instance of a smart contract, the last, temporally, status file is extracted from the blockchain and an instance of the contract, whose internal variables are valued according to what is reported in this status file. Therefore, a new execution of the instance is performed starting from the last state of the instance, as in case the same had been kept continuously in the node's memory.

An execution of the aforementioned operations in the context of object-oriented programming is immediate for the technician in the field.

Advantageously, only a copy of the instructions necessary to generate the smart contract instance is stored in the blockchain, which is "completed" by valuing the variables as previously stored at least in the last status file.

According to a preferred embodiment of the invention, the smart contract instance can be completed according to the methods of the smart contract itself that are invoked. It is performed, that is a completion on request: "on demand" of the instance in the node memory.

Furthermore, if only the values of the variables that have undergone an alteration during the previous execution are saved in the status files, then it may be necessary to extract the status files of the preceding instance backwards to extract the values of the variables involved in the current execution. In other words, the application is completed dynamically according to the method (s) invoked in the last call. Status files that contain only the variables altered by the last execution of an instance of a smart contract can be defined as "differential" status files.

The location of the status files of a predetermined instance of a smart contract are stored in the blockchain status.

This has two effects: the first effect is that the reconstruction of an instance of a smart contract, in the memory of the node, hereinafter referred to as the "de-serialization" procedure, is much faster because the amount of data to be extracted from the blockchain is very limited when compared with the classic strategy which involves loading a copy of the RAI memory area previously used for executing the same instance of the smart contract into RAM; the second effect is that the status file contains only the values of the instance variables and preferably only the values that have undergone an alteration in the last execution of the same instance.

In order to simplify the identification of the transactions where the status files are stored, each node can maintain a table, in the state of the blockchain where, for each instance of the smart contract, the position is associated, in terms of block and transaction number, in the blockchain of the various versions of the status file.

When a predetermined variable is not traced in the last available differential status file, the procedure recursively involves extracting the previous status file backwards from the blockchain and so on, until the value of this variable is identified.

In the context of the present invention, the procedure opposite to "de-serialization" is called "serialization" which consists in making persistent one or more data contained in the node RAM after the complete execution of a call to an instance of a smart contract. The fact of storing only the differences/variations in the status of an instance of a smart contract considerably simplifies the overall execution of the smart contract and, in particular, reduces the amount of memory involved, the processing times and the electricity needed for the processing.

The present invention allows the execution of a smart contract to be extremely performing to the point that this can be profitably implemented also in blockchains based on proof of stake.

In order to render the blockchain further efficient, when a plurality of calls invoke one or more methods of the same instance or even multiple instances of the same smart contract, they are not performed individually, but are performed in bulk.

The node that receives multiple requests to execute one or more instances of a smart contract defines a call execution order and stores this order within the state of the blockchain and executes these calls in succession, defining a corresponding block of status files. This block is referred, in the following, as the Delta-group.

Any further node, which wishes to check the execution of these calls, generates the instances involved, completing it with the last status of the same instance(s) available immediately before the execution of the above list of calls and executes these calls in the same order stored in the blockchain state. If no mistakes are made, the result must be the same.

Since calls to an instance can also be simultaneous, their ordering avoids incorrect results, guaranteeing a deterministic and verifiable result in response to a plurality of calls to a predetermined instance of a smart contract or to multiple instances of a smart contract, also when they are able to modify the same memory allocation.

This is particularly advantageous in the context of blockchains based on proof of stake, since, rather than checking and voting each individual call execution to an instance of a smart contract, it is possible to check and vote for a bulk of status files, it is worth to say a Delta-group.

Another main purpose of the invention is to untie the creation of a block of the blockchain with respect to the checking of transactions involving smart contracts. For this purpose, the known art provides that the completion of a block is subject to the execution of a smart contract included in it. In the context of blockchains based on proof of stake, a block is considered definitive only after it receives the majority of votes. A node votes for a block only after checking the entire block by also performing transactions involving smart contracts contained in the block's transactions.

According to the present invention, the block is voted assuming that the outcome of the execution of one or more (instances of one or more) smart contracts contained therein is correct.

The outcome of the execution of one or more calls to (instances of) smart contracts, on the other hand, is checked and voted subsequently and the outcome of the voting is subject to a transaction in a subsequent block. In other words, the votes are collected and stored by means of transactions in one or more successive blocks and when the vote decrees the acceptance or refusal of this result, the acceptance or refusal of this result is stored as a further transaction.

The collection of status files in the Delta-group makes the verification of numerous calls to a smart contract instance faster, while the fact of decorrelating the completion and verification of a block from the execution of these calls allows a faster crystallization of the blockchain.

As soon as a block voted by the majority of the nodes involved in the blockchain is deterministically definitive, in the same way, the execution of a plurality of calls to an instance of a smart contract is also considered deterministically definitive.

The set of details described above make a blockchain based on proof of stake extremely energy efficient and competitive with respect to the computing capacity of the computer farms used in blockchains based on proof of work.

The dependent claims describe preferred variants of the present invention, forming an integral part of the present description.

BRIEF DESCRIPTION OF THE DRAWINGS

Further objects and advantages of the present invention will become clear from the following detailed description of an embodiment thereof (and of its variants) and from the annexed drawings given purely for explanatory and non-limiting purposes, wherein.

The same numbers and the same reference letters in the figures identify the same elements or components.

In the context of this description, the term "second" component does not imply the presence of a "first" component. These terms are in fact used as labels to improve clarity and should not be understood in a restrictive way.

The elements and characteristics illustrated in the various preferred embodiments, including the drawings, can be combined with each other without however departing from the scope of the present application as described below.

DETAILED DESCRIPTION OF THE EMBODIMENTS

The present invention is described with the help of the figures.

Figure 1:
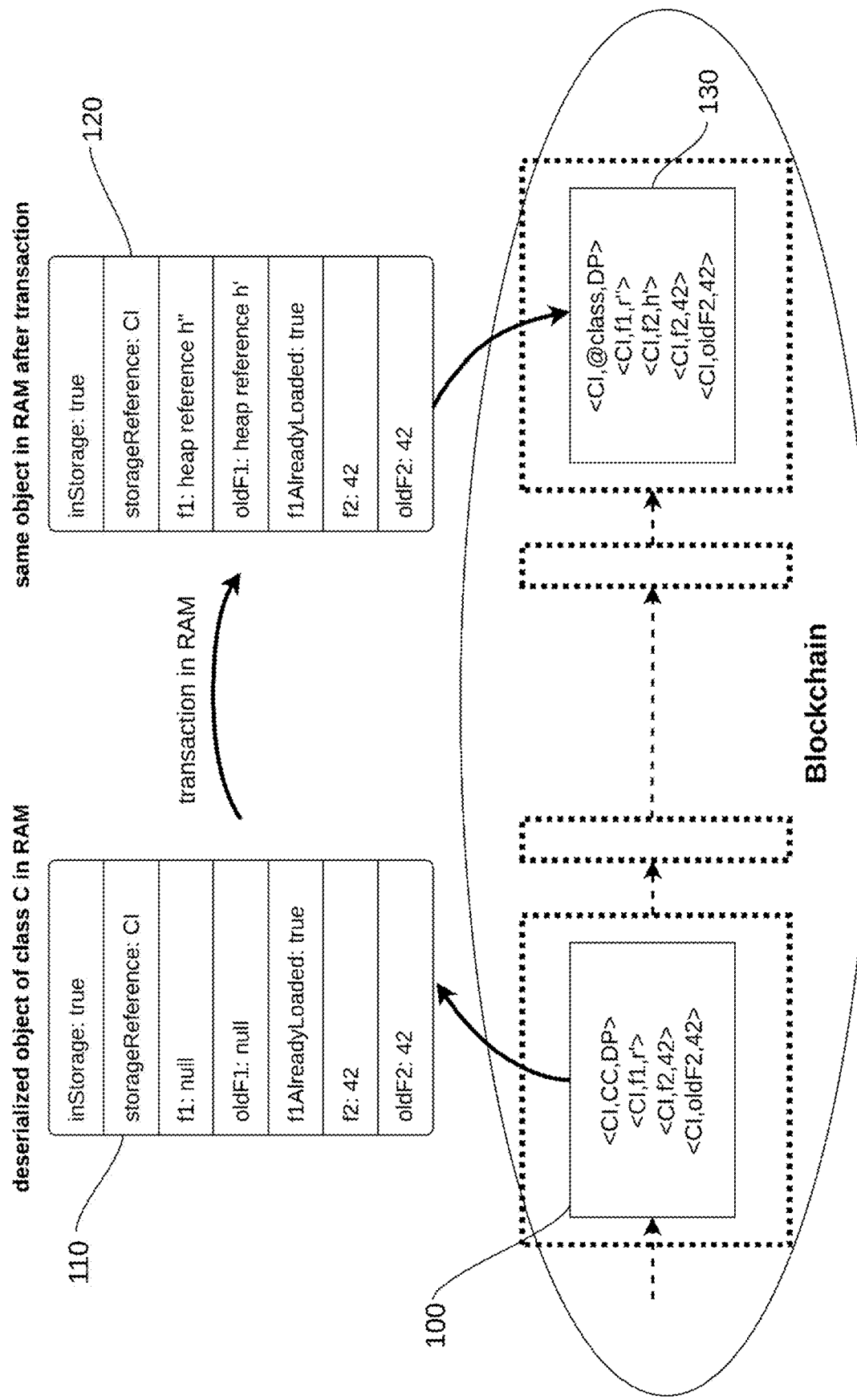
FIG. 1 schematizes the concept of serialization and deserialization of the state of an instance of a smart contract in connection with a blockchain.

FIG. 1 shows the procedure of de-serialization of an instance of a smart contract, the execution of a (method) of a smart contract and the subsequent serialization of the status of that instance.

Blocks 100 and 130 represent two transactions within a blockchain, respectively of reading or deserialization and of writing or serialization. Generally, these are two transactions in as many blocks of a blockchain. Between these two blockchain blocks there may be additional blockchain blocks, possibly processed by other nodes.

In transaction 100, information is serialized in a status file CC_1, about a specific instance CI of a smart contract DP.

DP indicates the so-called "deployment pointer", that is, the pointer to the transaction, within the blockchain in which the class or set of classes, for example ajar, of a smart contract is serialized. Each status file stored as a transaction in the blockchain is associated with a triple <CI, CC, DP>, where CI represents a pointer to a memory allocation to the (i-th) specific instance of the class identified by the DP pointer, while CC represents the status of that instance.

Furthermore, further triples <CI, var, update> are stored, for example <CI, f2, 42>, <CI, f1, r'>. Fields f1 and f2 represent two variables, for example respectively a pointer or static memory reference r', r'', r''', and a primitive, for example an integer.

The value of a primitive is immediately deserialized in the RAM memory of the node that makes a call to an instance of a smart contract and takes for example the value 42, while f1, which is a reference to a static memory allocation, is deserialized only if requested by the type of call made to the called instance.

Deserialization in RAM is indicated in FIG. 1 by means of block 110.

When it is necessary to use the variable f1, then the persistent memory content r' or r'', etc. is copied into the RAM respectively in the RAM allocations h', h'', etc..

The quotes r', r'', indicate persistent memory allocations, i.e. blockchain transactions. The sequence of these pointers/references represents the evolution of a portion of the status of this instance CI of the smart contract DP.

With reference to FIG. 1, from the transaction 100 a predetermined instance CI of a smart contract DP is deserialized into RAM memory. In a first phase of deserialization, the variable f1 remains null, as it is deserialized only if required by the method invoked of this instance.

The node notes that it is also necessary to deserialize f1 and load the static content pointed to/referenced by r' into the allocation h' of the RAM.

When the smart contract is executed, the status of this instance has changed and therefore appealed with h'', even if the physical allocation of the RAM memory remains unchanged. Block 120 shows this transition from state h' to state h'' into RAM. At the end of the execution, this content h'' is serialized in a new transaction in the same blockchain in the allocation r'' as shown in step 130.

The execution of one or more methods of the instance CI is indicated by the arrow that joins the blocks 110 and 120 on which "transaction in RAM" is indicated, ie the execution in the RAM memory of the node of the method(s) of the instance CI (CI_1, CI_2, . . . ) invoked by a call. If no changes are made to the content h', then it is not serialized, i.e. there is no h'' to be serialized. In fact, if it is assumed that only the variable f2 is subject to updating, then in block 130 only the triples relating to this update will be present. When a further execution of a call to a method of the (i-th) instance CI_1 of the smart contract DP is requested, the node will have to recover the state of f2 in the transaction 130 of the block and return to block 100 to carry out the deserialization of r' in h' relative to the variable ft.

Therefore, the last state of the instance can be rebuilt not only by deserializing the last state file, but deserializing the older state files backwards and recursively, until the portions of the last state of the instance necessary to be reconstructed satisfy the invoked call.

The inStorage field indicates that the instance CI has already been instantiated, therefore its call is valid.

The oldF1 field indicates the reference to the previous static allocation of the variable f1, therefore there is a situation of the type:

$$(f1:r''';oldF1:r') \text{ or } (f1:r'''';oldF1:r''))\text{etc.}$$

The same applies for the oldF2 field.

Unlike the references/pointers, the primitives are always deserialized and therefore it can happen that f2 and oldF2 have the same value, 42 in the example.

When updating leads to a change, it may happen for example that the situation is of the type: oldF1: 14; f1: 42.

The boolean field f1Alreadyloaded indicates whether f1 is null only because it has not been deserialized in RAM or if f1 has no content to be pointed/referenced.

Some fields, including inStorage, storageReference, oldF1, oldF2 and f1 AlreadyLoaded are completely optional and when implemented, these are automatically generated in the deserialization process.

In fact, a so-called instrumentation is foreseen, that is, a post-compilation procedure of the code generated by the programmer, according to which lines of code are inserted, transparently to the programmer, that allow the on-demand serialization and deserialization of the variables necessary for the execution of an instance of a smart contract. These are techniques known to those skilled in the art that do not require further study here.

For example, in the context of object-oriented programming, it is sufficient that the programmer who generates a class must simply extend a predetermined instrumentation class, and recall the methods necessary for the deserialization and serialization of the variables that he/she wishes to make persistent. With the compilation, according to the prior art, machine code is generated which includes instructions for the automatic serialization of the variables and the deserialization of the same, on-demand.

oldF2 represents the penultimate update of the variable f2 which obviously has not changed since the last update.

Figure 4:
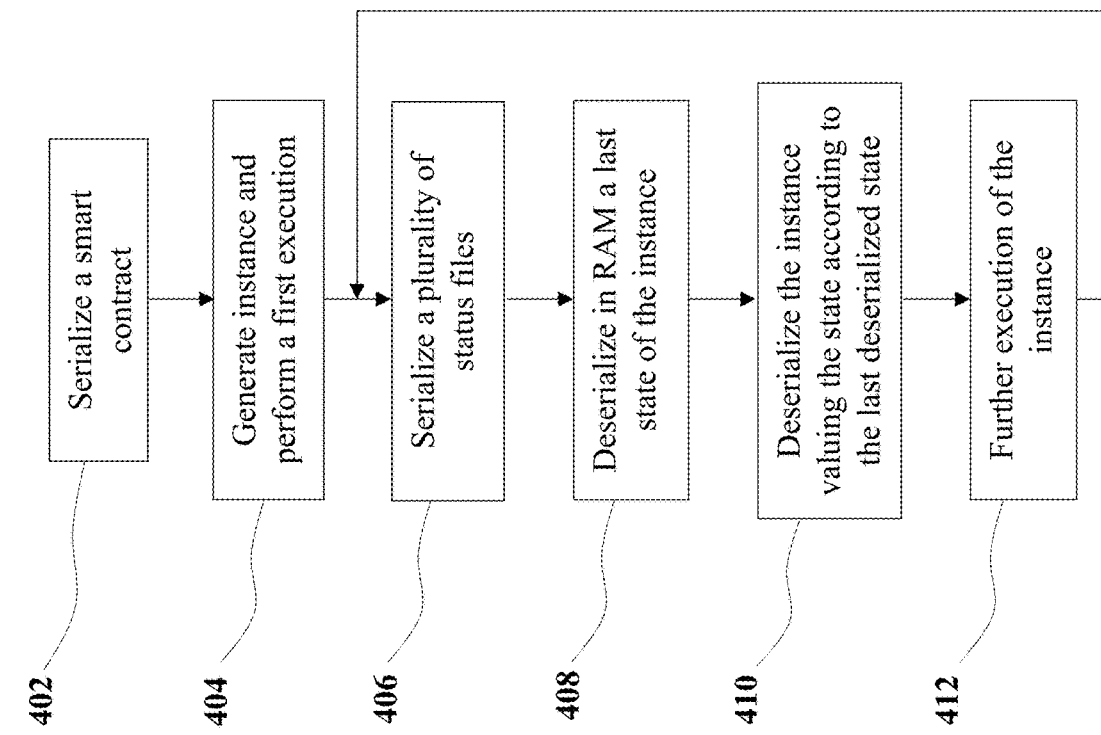
FIG. 4 schematizes the concepts shown in FIG. 1 in terms of flowchart.

Therefore, with reference to FIG. 4, the present invention relates to an executing method 400 of an instance CI_1 of a smart contract DP using a blockchain shared between a multitude of nodes, wherein the method includes, at step 402, the first step of serializing a smart contract in the blockchain, namely a class or a jar, and generation of a pointer DP to the serialized smart contract.

At step 404, at the first call of a smart contract method a second generation step of an instance (CI_1) of said smart contract is performed and therefore a first execution of at least one method of said instance is performed. Evidently, the internal variables of the instance received an update following the execution of the at least one method.

At this point, the following steps are performed in cyclical succession:

At step 406, a third step of serializing in the blockchain a plurality of status files (CC_1, CC_2, ... CC_i) each containing the status defined only by the internal variables (f1, f2) of said instance at the end of a respective plurality of executions of the instance, said plurality of status files resulting temporally ordered according to the respective executions of the instance, At step 408, a fourth step of deserialization in RAM of a last state of the instance by deserializing at least one last state file (CC_i) from said blockchain and At step 410, a fifth step of deserialization of said first instance (CI_1) valuing the state according to said last deserialized state, At step 412, a sixth step comprising a further execution of said instance (CI_1).

The fifth step corresponds to the transition indicated in FIG. 1 with "transaction in RAM".

Cyclic execution is determined by events, i.e. when at least one call to a method of that specific instance occurs.

The pointer DP is preferably saved in the state of the block chain.

When there is a call to a new instance of a smart contract, the deployment pointer DP is invoked.

If this is marked as invalid, the creation of the instance is automatically aborted, otherwise this new instance is generated and a pointer called the "contract instance" CI (CI_1, CI_2, etc) is associated with it.

This pointer CI identifies a specific instance of a smart contract. It is therefore evident that a plurality of instances can be generated of a smart contract DP.

For convenience, the reference DP is used to indicate indifferently the pointer and the smart contract to which the pointer points.

Each instance has its own specific pointer CI (CI_1, CI_2, CI_3, etc. ... ).

For example, a smart contract can relate to a fundraiser. Then CI_1 is for a fundraiser for a first initiative, CI_2 for a fundraiser for a second initiative, and so on.

Figure 2:
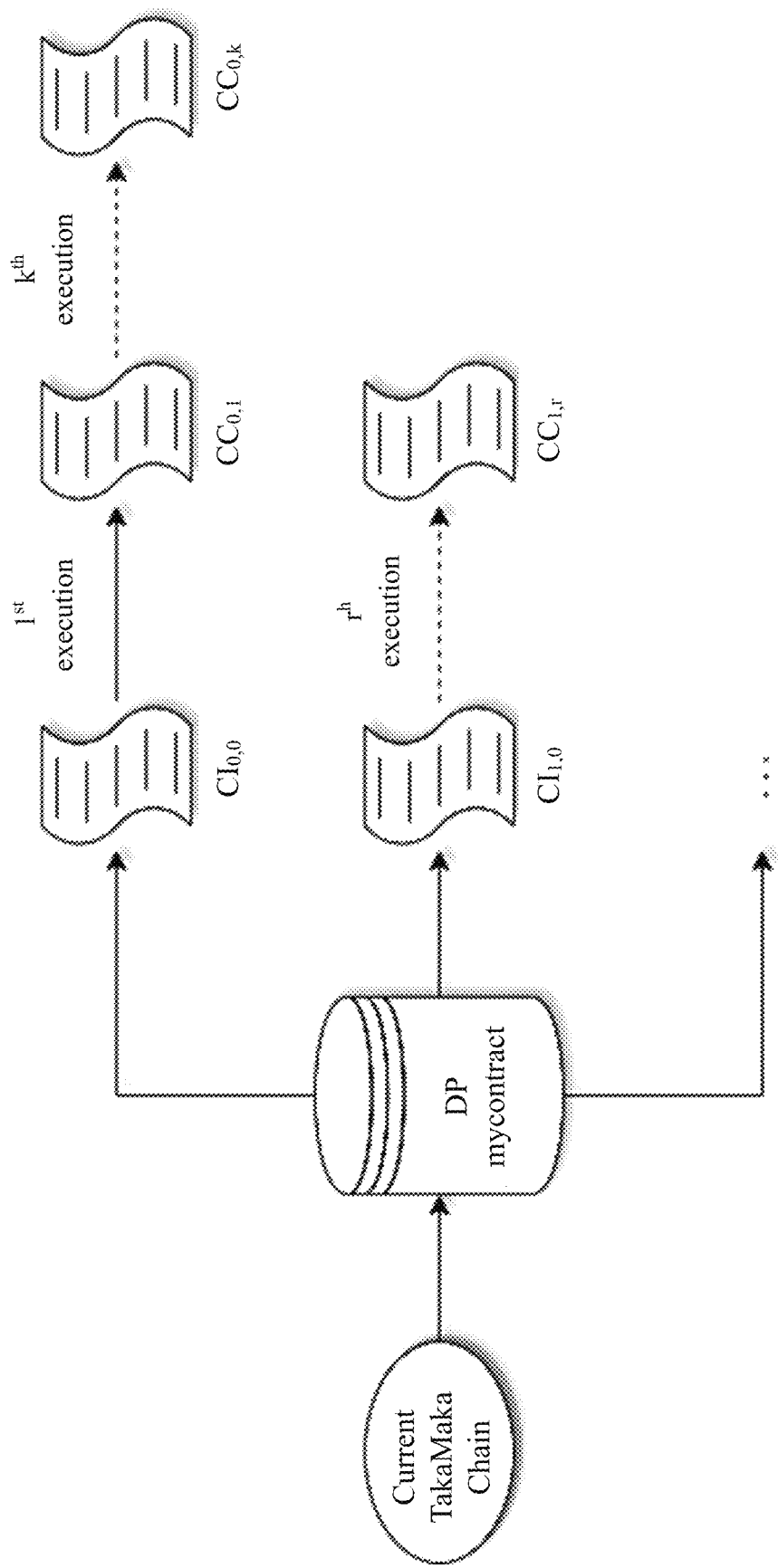
FIG. 2 schematizes the concept of parallel execution of a plurality of instances of the same smart contract.

FIG. 2 shows a situation in which from a static location, i.e. from a blockchain transaction, where a class or a class container, typically ajar in Java, is stored, multiple objects CI are created from 0 and N (CI_1 ... CI_n). Each object is associated with a plurality of status files from 0 to k for CI_1 or from 0 to z for CI_2, etc. ....

Figure 3:
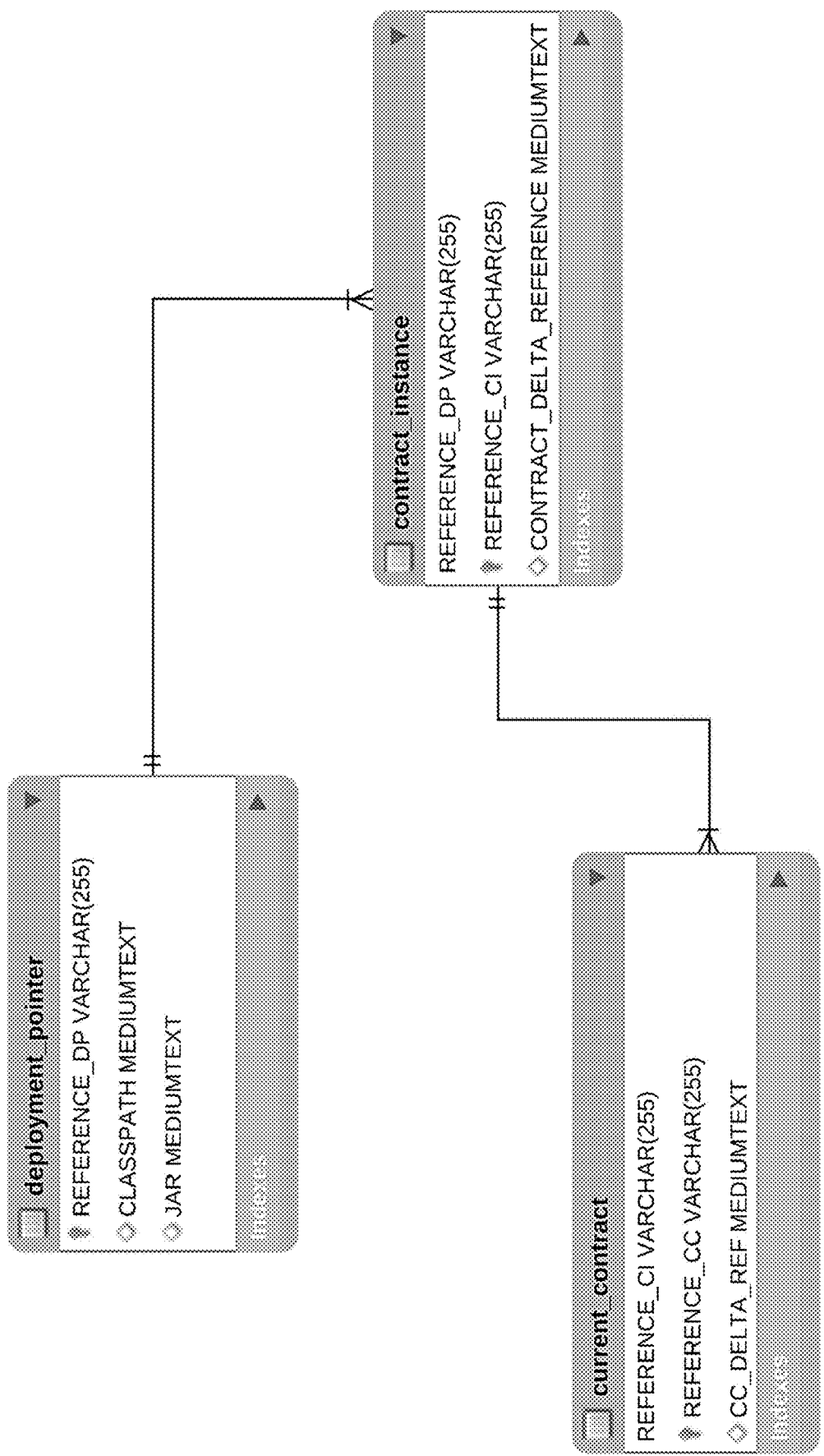
FIG. 3 shows a relationship between a smart contract and a plurality of relative instances and for each instance a relationship with a relative plurality of status files.

FIG. 3 shows the relationships 1-to-many between the deployment pointer DP and the contract instance CI instances and between each instance CI and the current contract CC status files.

Evidently, the two fundraisers are proceeding completely independently and therefore one, being more successful than the other, may present a greater number of transactions than the other.

Evidently, each transaction, intended as donations, corresponds to an update of the status of the specific smart contract instance and therefore corresponds to a status file CC_i.

The node selected to make a call to a method of an instance of a smart contract can receive multiple requests to execute methods of the same instance of a smart contract. This node arbitrarily defines a call execution order and stores this order within the state of the blockchain and executes these calls in succession, defining a corresponding block of status files. This block is referred in the followings as Delta-group.

Any further node, which wishes to verify the execution of these calls to an instance of a smart contract, performs the generation of the instance, completing it with the latest status of the same, available immediately before the execution of the aforementioned list of calls, and makes these calls in the same order stored in the state of the blockchain. If there is concordance in the result obtained, the result must be the same. When the result is the same, this node communicates its approval in broadcast. When the result differs, the verifying node broadcasts its result.

This can be in the form of hash according to a per s known method of calculation.

When a certain result has obtained more than 50% of the votes of the nodes that have the right to vote, then this result is acquired as definitive obtaining the so-called finality. The result of the vote is itself stored in a transaction in a block subsequent to the blockchain transaction, which reports the execution of the Delta-group. Therefore, the blockchain can continue to grow without having to wait for the finality. The finality, i.e. the approval of a result is achieved while the blockchain continues to grow without constraining the acceptance of a new block to the correct result obtained by processing an instance of a smart contract.

In other words, compared to the known art, the execution of an instance of a smart contract and the finalization of a block are mutually independent events allowing to reduce execution time while using not particularly performance and energy-consuming nodes.

Advantageously, the fact of keeping the position of the state files in the state of the blockchain allows to dynamically delete the allocations concerning obsolete state files. Indeed, the fact of reaching the finality in a deterministic way allows one to take as granted a predetermined state of an instance, being able to "forget" the previous states. This is advantageous not only in terms of performance but also because it limits the number of serializations to the bare minimum.

The result of the execution of a Delta-group consists of a bulk of status files which is serialized in the blockchain.

Several calls to different instances CI_1, CI_2, CI_3 of the same smart contract can be made in the same Delta-group. Since the sorting of the list is arbitrarily established and also serialized in the blockchain, any execution without calculation errors leads to the same bulk of status files.

Since calls to an instance can also be simultaneous, their ordering avoids incorrect results, guaranteeing a deterministic and verifiable result in response to a plurality of calls from one or more instances of a smart contract.

Some methods of an instance are reading at least one variable. As long as it is only a reading, then it can be given access to the variable at the end of the execution of the Delta-group. On the other hand, when the reading of a variable is preliminary to the variation of the status of an instance of the smart contract, then, the read call is also ordered in the Delta-group.

The present invention can be advantageously carried out by means of a computer program which comprises coding means for the realization of one or more steps of the method, when this program is executed on a computer. Therefore, it is understood that the scope of protection extends to said computer program and further to computer readable means which comprise a recorded message, said computer readable means comprising program coding means for carrying out one or more method steps, when this program is run on a computer.

Preferably, each node of the network that shares the blockchain object of the present invention can be formed by one or more electronic computers connected to each other in a "cluster", ie in a way known per se.

The present invention, therefore, not only protects the code and the code support for realizing the present method, but also each node of a network of computers programmed to carry out the present method.

Possible variations to the non-limiting example described are possible, without however departing from the scope of protection of the present invention, including all the equivalent realizations for a person skilled in the art, to the content of the claims.

From the above description, the person skilled in the art is able to realize the object of the invention without introducing further construction details.

What is claimed is:

1. A method for executing an instance of a smart contract by a blockchain shared between a plurality of nodes, comprising
   a first step of serialization in the blockchain of the smart contract and generation of a pointer to the smart contract,
   a second step of generating the instance of the smart contract and a first execution of at least one method of the instance,
   and comprising the following steps in a cyclic succession:
   a third step of serialization in the blockchain of a plurality of status files, wherein each of the plurality of status files contains a state that defines the instance only by at least one internal variable of the instance that is altered by a most recent execution of the at least one method of the instance at an end of a respective plurality of executions of the at least one method of the instance, each of the plurality of status files omitting a value of any internal variables of the instance that are unaltered, wherein the plurality of status files are temporally ordered according to the respective plurality of executions of the instance,
   a fourth step of deserialization in a RAM of a last state of the instance deserializing at least one last status file from the blockchain,
   a fifth step of deserialization of the instance valuing a state of the instance according to a last deserialized state, and
   a sixth step comprising a further execution of the at least one method of the instance,
   wherein in the each of the plurality of status files only internal variables affected by a change in the respective plurality of executions of the instance are saved, and
   wherein, if a call to a new instance is marked as invalid, creation of the new instance is automatically aborted,
   wherein the internal variables of the deserialization are valued on a request, only when necessary to perform one or more methods of executing the instance to obtain an executed instance,
   the method further comprising a step of deserializing the plurality of status files recursively from a last to an oldest up to deserialize the internal variables necessary for an execution of the one or more methods of the executed instance,
   wherein a plurality of requests for executing the instance of the smart contract are grouped together and executed serially in a predetermined order and an arbitrary execution order indicated as a Delta-group, and wherein a node executing the Delta-group presents results of execution in a single bundle of the results and serializes the single bundle of the results in a single blockchain transaction.

2. The method according to claim 1, wherein a position in the blockchain of each status file of the plurality of status files is stored in a table shared by the plurality of nodes.

3. The method according to claim 1, wherein a validation of the single bundle of the results is independent of a validation of a block of the blockchain containing the single blockchain transaction.

4. The method according to claim 1, wherein a Delta-group execution result consists of an ordered bundle of corresponding status files.

5. The method according to claim 1, wherein the Delta-group comprises a list of the plurality of requests for executing a first instance and of further instances of the smart contract.

6. The method according to claim 1, wherein a final result is considered a definitive when the final result obtains a predetermined percentage of votes from the plurality of nodes and wherein positions of the plurality of status files are dynamically erased, as most recent final results are approved.

7. A computer architecture, comprising a plurality of processing nodes, wherein each of the plurality of processing nodes comprises a storage medium, wherein instructions for storing corresponding instructions of the steps of claim 1 are stored in the storage medium.

8. A non-transitory computer-readable storage medium comprising program code configured to cause a computer to perform the method of claim 1 when the computer executes the code.

9. The method according to claim 2, wherein the keeping of the position in the blockchain of each status file of the plurality of status files allows dynamic deletions of memory allocations associated with obsolete status files.

10. The method according to claim 6, wherein reaching finality in a deterministic way reduces a number of serializations.

11. The method according to claim 1, wherein the at least one internal variable comprises machine code executed in the instance.

\* \* \* \* \*